US009027124B2

(12) United States Patent
Mendel et al.

(10) Patent No.: US 9,027,124 B2
(45) Date of Patent: May 5, 2015

(54) SYSTEM FOR MONITORING AN OPERATION OF A DEVICE

(75) Inventors: Jacob Mendel, Kibbutz Givat Brenner (IL); Alexander Potievsky, Kfar Saba (IL)

(73) Assignee: Broadcom Corporation, Irvine, CA (US)

( * ) Notice: Subject to any disclaimer, the term of this patent is extended or adjusted under 35 U.S.C. 154(b) by 263 days.

(21) Appl. No.: 13/470,697

(22) Filed: May 14, 2012

(65) Prior Publication Data

US 2013/0061097 A1   Mar. 7, 2013

Related U.S. Application Data

(60) Provisional application No. 61/531,491, filed on Sep. 6, 2011.

(51) Int. Cl.
G06F 21/00 (2013.01)
G06F 21/54 (2013.01)
G06F 11/07 (2006.01)

(52) U.S. Cl.
CPC ............ *G06F 21/54* (2013.01); *G06F 11/0757* (2013.01)

(58) Field of Classification Search
CPC ....... G06F 21/52; G06F 21/554; G06F 12/14; G06F 2221/2101; G06F 2221/2151
USPC .......................................... 726/22–24, 27–30
See application file for complete search history.

(56) References Cited

U.S. PATENT DOCUMENTS

| 2007/0204257 | A1* | 8/2007 | Kinno et al. | 717/100 |
|---|---|---|---|---|
| 2008/0222407 | A1* | 9/2008 | Carpenter et al. | 713/2 |
| 2009/0300156 | A1 | 12/2009 | Yalakanti et al. | |
| 2010/0017879 | A1* | 1/2010 | Kuegler et al. | 726/23 |
| 2011/0023118 | A1* | 1/2011 | Wright | 726/23 |
| 2011/0265182 | A1* | 10/2011 | Peinado et al. | 726/24 |
| 2011/0289586 | A1* | 11/2011 | Kc et al. | 726/24 |
| 2012/0185936 | A1* | 7/2012 | Lakshminarayanan | 726/22 |
| 2013/0024937 | A1* | 1/2013 | Glew et al. | 726/23 |

OTHER PUBLICATIONS

Gao et al., "Gray-Box Extraction of Execution Graphs for Anomaly Detection", pp. 1-12, Proceeding CCS '04 Proceedings of hte 11th ACM conference on Computer and Communications Security pp. 318-329.*

* cited by examiner

*Primary Examiner* — Hadi Armouche
*Assistant Examiner* — Hee Song
(74) *Attorney, Agent, or Firm* — Brinks Gilson & Lione

(57) ABSTRACT

A system monitors an application. The system includes a state table with state table nodes corresponding to application checkpoints. The state table nodes include an authorized time interval and application path. The system also includes a time counter that tracks an operation time between successive application checkpoints, and a program counter that tracks and stores an operation path for the application. A checkpoint module verifies an operation of the application at a checkpoint by comparing the authorized time interval for the checkpoint state table node and the operation time tracked by the time counter, as well as the authorized application path for the checkpoint state table node and the operation path tracked by the program counter. A security action is performed when the tracked operation time is not within the authorized time interval, or when the tracked operation path does not match the authorized application path.

19 Claims, 7 Drawing Sheets

SYSTEM FOR MONITORING AN OPERATION OF A DEVICE

RELATED APPLICATIONS

The present patent application claims the benefit of the filing date under 35 U.S.C. §119(e) of provisional U.S. patent application Ser. No. 61/531,491, filed Sep. 6, 2011, which is hereby incorporated by reference.

TECHNICAL FIELD

This disclosure relates to systems and methods (generally referred to as systems) for monitoring and verifying an operation of a device. More specifically, this disclosure relates to a secured system for monitoring, verifying, and controlling the operation of an application performed by or using a device.

BACKGROUND

For many years, significant advances in technology have driven strong growth in the availability and capability of electronic devices. Increasingly complex and efficient electronic devices may be used to perform many operations and tasks, as well as to run a plethora of programs and applications. As just a few examples, it is not unusual for cell phones, laptops, tablet computers, Global Positioning System ("GPS") devices, gaming systems, and televisions to run intricate applications and perform technical tasks.

BRIEF DESCRIPTION OF THE DRAWINGS

The system may be better understood with reference to the following drawings and description. In the figures, like reference numerals designate corresponding parts throughout the different views.

DETAILED DESCRIPTION

Electronic devices may be used to access and run various programs and applications ("applications") that may be designed and configured to request, include, manage, or otherwise handle sensitive or personal information, such as biographical information, financial information, or medical information.

Figure 1:
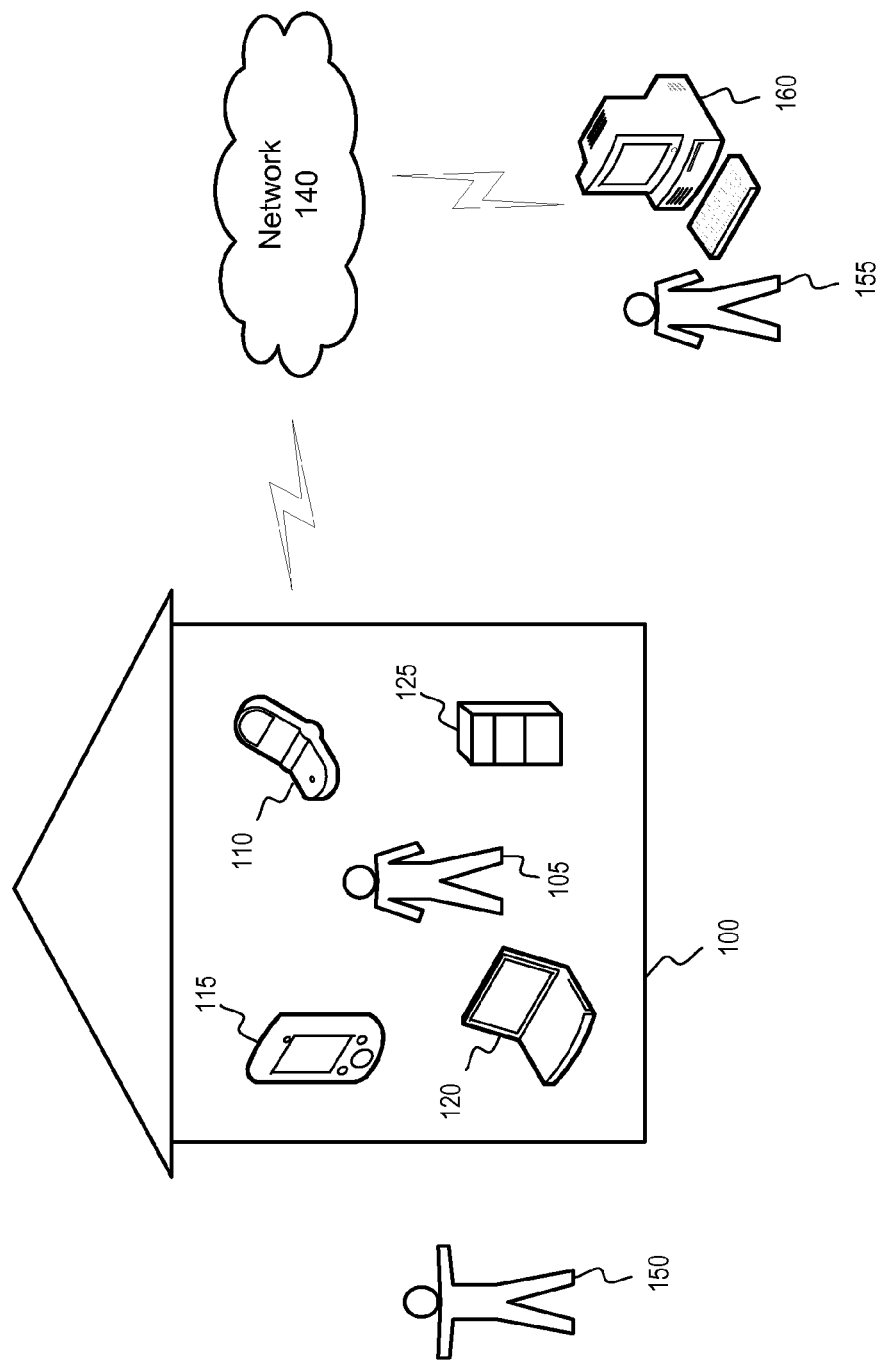
FIG. 1 is an exemplary block diagram of an environment that includes devices incorporating systems and methods for monitoring and verifying an operation of a device.

FIG. 1 is an exemplary block diagram of an environment 100 with various electronic devices 110, 115, 120, and 125, one or more of which may incorporate systems and methods for monitoring and verifying an operation of a device. The devices 110, 115, 120, and 125 in the environment 100 may communicate with each other, and/or may communicate with other devices in other environments, such as through or using a wired or wireless network 140.

The environment 100 may, for example, be a home environment 100 of a user 105, and may include a number of electronic devices, such as a phone 110, a personal digital assistant 115, a computer 120, and a server 125. As another example, the environment 100 may be a military environment with one or more processors or servers associated with or responsible for storing or processing sensitive data such as, confidential or top secret information and various other military or private information. As another example, the environment 100 may be a governmental environment with one or more electronic devices used to scan, gather, process, and sort through citizenship and electronic ID information for one or more citizens or individuals. As another example, the environment 100 may be a banking or other financial environment with processors, electronic card scanners, and various other electronic devices configured to gather, store, and process credit card, bank account, or other financial records for one or more users. Various other environments 100 and devices 110, 115, 120, and 125 are possible.

One or more of the devices 110, 115, 120, and 125 may run one or more applications. For example, a smart phone 110 in the home environment 100 may run one or more applications which may be used by a user 105 to perform a remote bank transaction. In another example, a server 125 in a military environment 100 may compile and store confidential or citizenship information about one or more citizens or soldiers. In a third example, a computer in a banking environment 100 may run one or more applications to track financial transactions performed. Various other examples are possible.

Figure 2:
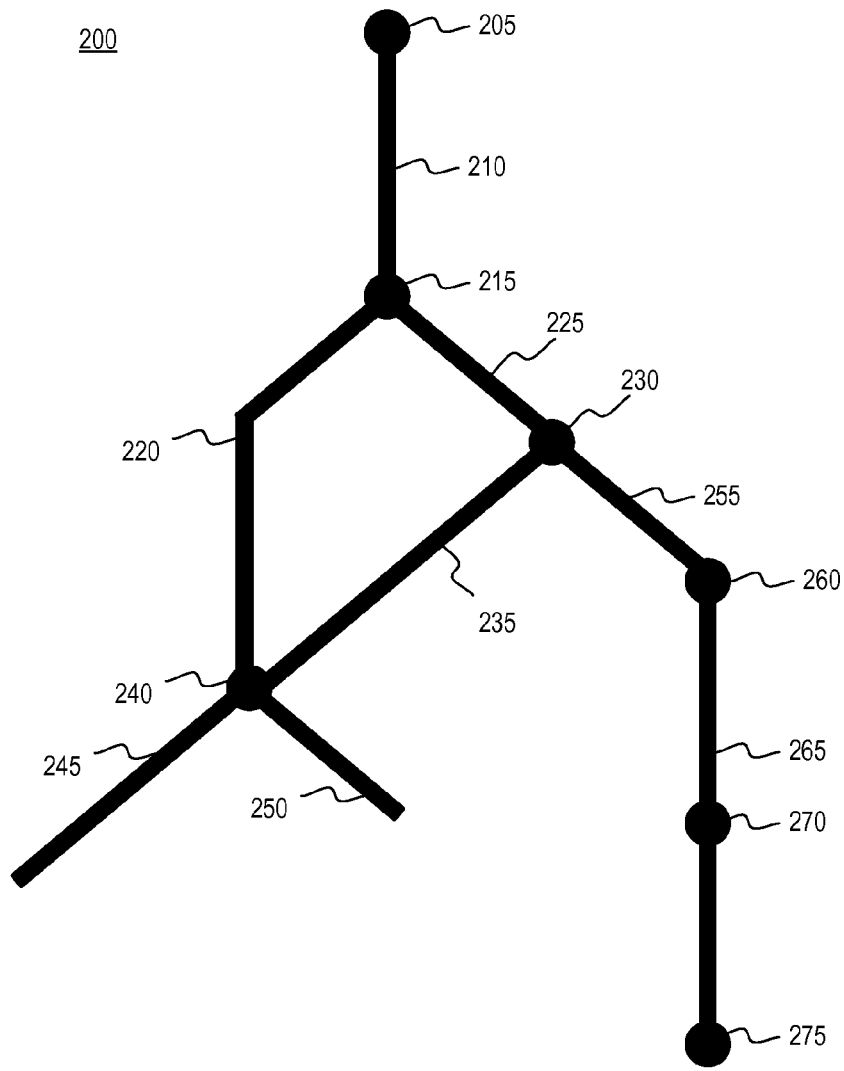
FIG. 2 is an exemplary flow diagram of an application that may be operated by a device.

FIG. 2 is an exemplary flow diagram of an application 200 that a device 110 in an environment 100 may run or otherwise perform. The application 200 may be configured to perform a plurality of actions, processes, functions or routines ("routines") 210, 220, 225, 235, 245, 250, and 265, in a designated or anticipated order and/or within a designated period of time. Each routine may be made up of or include one or more actions, instructions, or lines of code of an application. The application 200 may be configured or operable so that identified or set values, such as values of a memory pointer, can be observed at one or more checkpoints 205, 215, 230, 240, and 260 during an operation of the application. Checkpoints of the application 200 may relate, for example, to a start or initiation point 205 of the application 200 or a routine, one or more decision points or branch points 215, 230, 240, and 260 of the application 200, an intermediate point 270 of a routine 265 of the application 200, or an endpoint 275 of the application 200. The checkpoints may be automatically or manually determined or identified.

Thieves 150 and hackers 155 may attempt to monitor, acquire, intercept, change, reconfigure, adjust, attack, destroy, or otherwise interfere with information or data stored or transmitted to or from one or more devices 110, 115, 120, and 125 or applications 200 being used or run on the devices. For example, a thief 150 may try to break into an environment 100 and physically steal, modify, alter, or hack into one or more applications 200 being run on the devices 110, 115, 120, and 125. The thief 150 may attempt to change the flow control of software or an application 200 via an external mechanism such as with a laser attack, modifying a clock of a chip, modifying a voltage of a chip, light attacks, protocol or hardware attacks, or by modifying a running speed or temperature of the device. In addition or alternatively, a hacker 155 may attempt to digitally or electronically hack into one or more applications 200 being run on one or more of the devices 110, 115, 120 and 125, such as by or through an electronic device 160 connected with the network 140. Various other examples or risks and dangers are possible. To deter, protect against, or prevent such attacks, a device may include or utilize a system of monitoring, verifying, and/or controlling an operation of the application 200 on the device.

Figure 3:
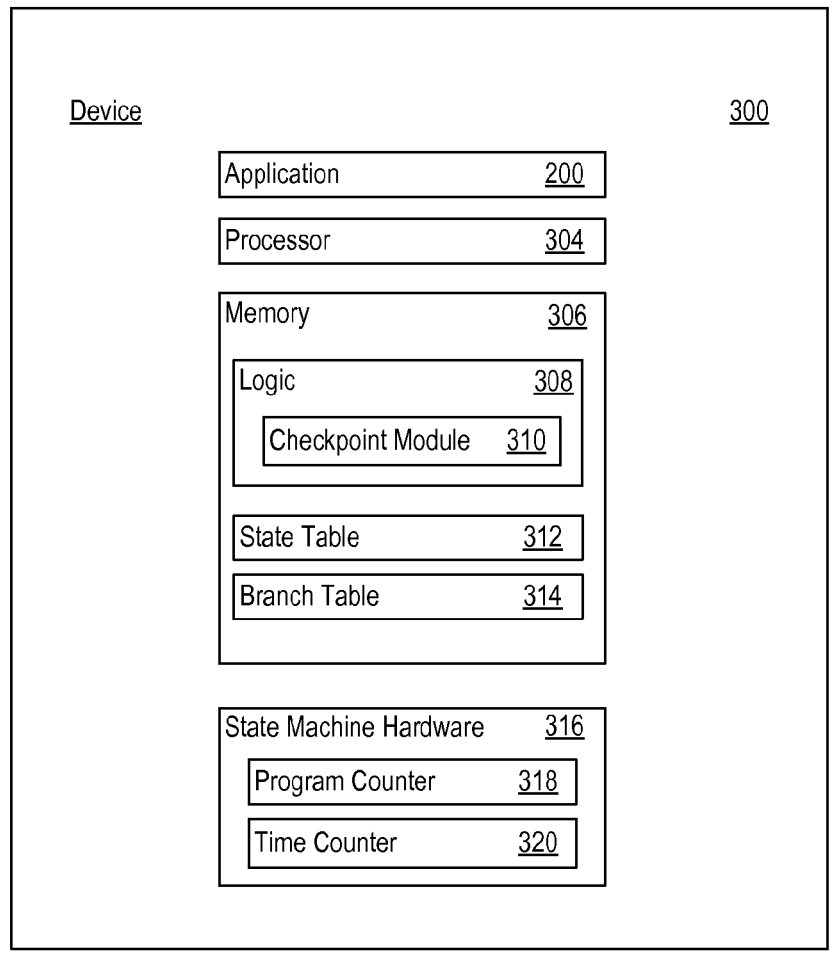
FIG. 3 is an exemplary block diagram of a device that incorporates a system for monitoring and verifying an operation of a device.

FIG. 3 is a block diagram of a device 300 which may include or utilize a system for monitoring and verifying an operation of a device application to prevent infiltration of the application 200 or electronic device 300. The verification system of the device 300 may identify or monitor an order of routines, actions, or instructions performed by an application (also referred to as an application path), an amount of time that it takes an application to move from one step to another, and values at one or more checkpoints of an application to verify and protect an operation of an application. The verification system may sense that the application has been compromised, infiltrated, or otherwise tampered with when the system detects that one or more routines of an application have been completed in an invalid order or an unauthorized amount of time, or where unauthorized values are identified at one or more checkpoints. In these situations, the verification system may take one or more security actions or initiate a security reset of the device 300 to protect the application 200 and the device 300. While the verification system of the device 300 is described as monitoring and verifying an operation of an application, the verification system could be used to monitor or verify various other functions, systems, components, or operations of an electronic device.

The device 300 may be or resemble any of the devices 110, 115, 120, and 125 in the environment 100, and may take any form. As examples, the device 300 may be a laptop, desktop, or other type of computer, a smart phone or other phone, a server, a personal data assistant, or a portable email device. Additional examples include televisions, stereo equipment such as amplifiers, pre-amplifiers, and tuners, home media devices such as compact disc ("CD")/digital versatile disc ("DVD") players, portable MP3 players, GPS devices, high definition (e.g., Blu-Ray™ or DVD audio) media players, or home media servers. Other examples of devices 300 may include vehicles such as cars and planes, secure devices, societal infrastructure such as power plants, traffic monitoring and control systems, or radio and television broadcasting systems. Further examples include home climate control systems, washing machines, refrigerators and freezers, dishwashers, intrusion alarms, audio/video surveillance or security equipment, video games, network attached storage, and network routers and gateways. The devices 300 may be found in virtually any context, including the home, business, public spaces, or automobile. Thus, as additional examples, the devices may further include automobile engine controllers, audio head ends or DVD players, satellite music transceivers, noise cancellation systems, voice recognition systems, climate control systems, navigation systems, alarm systems, or other devices.

The device 300 may include one or more of a processor 304, a memory 306, logic 308, a checkpoint module 310, a state table 312, a branch table 314, a state machine hardware 316, a program counter 318, and a time counter 320. The device 300 may include or otherwise access and run the application 200, such as with or using the processor 304 or another component. Fewer or more components may be included with the device 300. One or more of the components of the device 300 may be or make up the verification system. For example, in some systems, the checkpoint module 310, the program counter 318, and the time counter 320 may be or may make up the verification system. Other examples are possible.

The processor 304 may implement a software program, such as code or logic 308 generated manually (e.g., programmed) to control functionality of a checkpoint module 310. The processor 304 may additionally or alternatively run or otherwise access and use the application 200. The memory 306 may be operable to store instructions, code, or logic 308 executable by the processor 304 for implementing the checkpoint module 310. The logic 308 may include an operating system, application program, firmware, or other logic. While the checkpoint module 310 is shown as logic 308, the checkpoint module 310 may also or alternatively be software, code, or other instructions which may, for example, be stored in or apart from memory 306, hardware, a microcontroller, a central processing unit ("CPU"), an application-specific integrated circuit ("ASIC"), or various other hardware components, software components, firmware components, or combinations of components.

The checkpoint module 310 may be configured or otherwise utilized to monitor and verify an operation of the application 200 running on the device 300. The checkpoint module 310 may, alone or in conjunction with one or more tables 312 and 314 and counters 318 and 320, monitor and perform one or more verification functions that may ensure that an application 200 or device 300 has not been infiltrated or compromised by a thief or hacker. The checkpoint module 310 may, for example, access or utilize information stored in a state table 312 to help protect against tampering.

Figure 4:
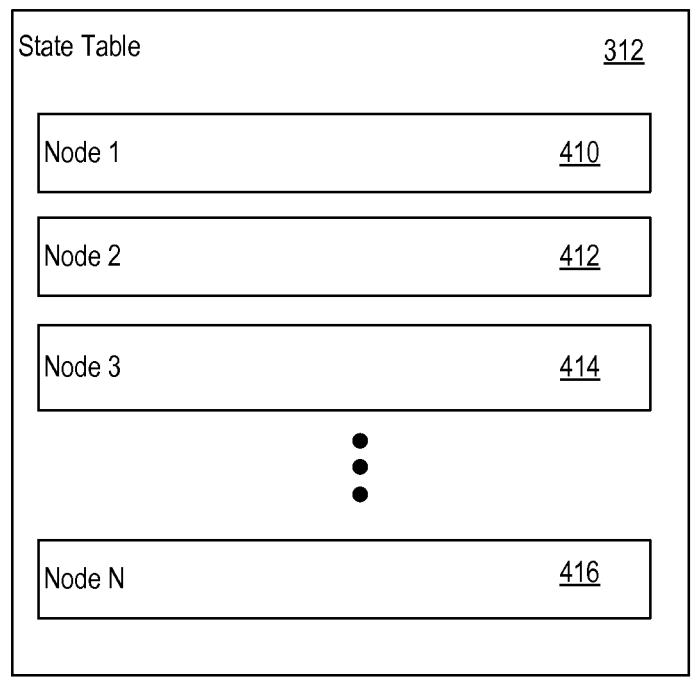
FIG. 4 is an exemplary block diagram of a state table.

FIG. 4 shows an example of the state table 312. The state table 312 may include information and data about one or more state table nodes 410, 412, 414, and 416. Nodes 410, 412, 414, and 416 may correspond to checkpoints of the application 200 and may be automatically or manually designated or identified. The state table 312 may include information and data about some or all nodes or checkpoints of an application 200.

Checkpoints and nodes 410, 412, 414, and 416 may be identified, determined, or designated at points in the application 200 that occur before or after critical or important operations. For example, a checkpoint or node of the application 200 may be designated at a point before cryptographic keys are used in the application 200, before or after performing various cryptographic operations, before or after entering or transmitting personal or sensitive information such as financial, medical, bank, or biographical personal information, secret or confidential information military information, and various other types of information.

Figure 5:
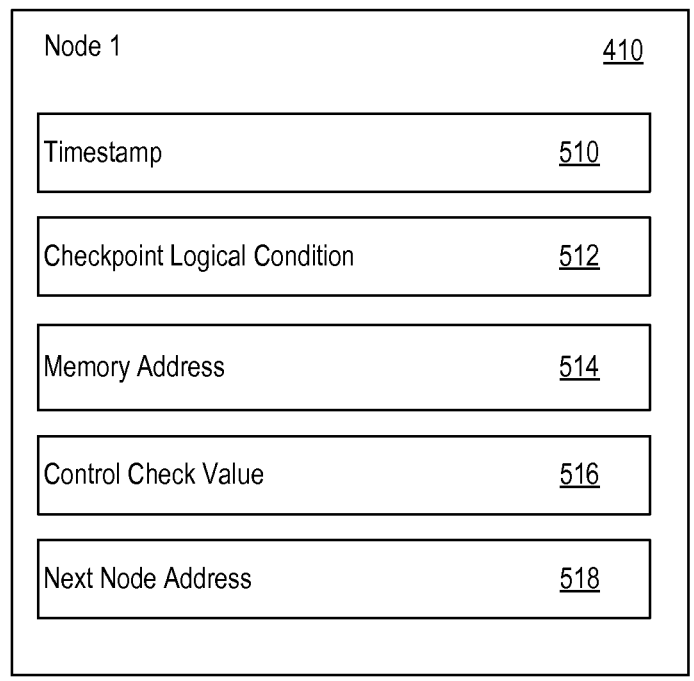
FIG. 5 is an exemplary block diagram of a state table node.

FIG. 5 shows an exemplary state table node 410. Nodes 410, 412, 414, and 416 designated in the state table 312 may include various information about a checkpoint of the application 200, such as authorized program counter values, authorized stack pointer values, authorized specific software pointer values, authorized specific memory content values, and other values or information. For example, the node 410 may include timestamp information 510. The timestamp information 510 may identify or signify an authorized time that an application 200 may take to proceed from a previous node to the present node 410. The timestamp information 510 may include one or more authorized time intervals or periods. For example, the timestamp information 510 may include two time intervals, such that any actual time within either of the two time intervals or periods may be considered an authorized time. Other variations are possible. If the application 200 does not proceed within the allotted time, a checkpoint error may be detected and/or a security action may be performed, as discussed later.

The node 410 may also or alternatively include one or more checkpoint logical conditions 512. The checkpoint logical condition 512 may identify or signify one or more conditions or requirements which should be satisfied by or at the checkpoint corresponding to the node 410. As an example, a checkpoint logical condition 512 may specify one or more authorized application paths or order of routines which the application 200 may be required to perform prior to arriving at the checkpoint corresponding to node 410. As some checkpoints may be reached through at least two different authorized paths, such as checkpoint 240, more than one authorized path or order of routine may be specified in some systems.

A checkpoint logical condition 512 may also or alternatively provide various different logical comparison operations between one or more values, such as between a control check value 516 and one or more data values of an observed memory pointer, which may be referred to as runtime reference data. Examples of some logical operations may be or include OR, AND, XOR (Exclusive OR), or NOT functions, "Equal," "Not Equal," "Include," or "Not Include" conditions, and/or one or more arithmetic operations. As an example, the checkpoint logical condition 512 may specify an "Equal" condition, whereby the memory pointer value observed or obtained by or at a memory address must match the control check value 516 for that checkpoint. Other examples are possible. If the logical conditions are not met by the application 200, a checkpoint error may be detected and/or a security action may be performed, as discussed later.

The node 410 may also or alternatively include one or more memory address 514. The memory address 514 may identify or signify one or more authorized addresses of a memory pointer observed at a checkpoint corresponding to the node 410. In some systems, more than one memory address 514 and memory pointer may be expected or authorized at each checkpoint. The memory addresses 514 may be used to verify the address of a memory pointer observed at the checkpoint corresponding to the node 410. If the address is not verified, a checkpoint error may be detected and/or a security action may be performed, as discussed later.

The node 410 may also or alternatively include one or more control check values 516. The control check values 516 may indicate values of the contents of a memory pointer observed at the checkpoint corresponding to the node 410. For example, where a memory pointer has a value of 0x3010 and content of this the memory pointer has a value of 67, the memory address 514 may be 0x3010 and the control check value 516 may be 67. In this case, if a checkpoint logical condition 512 defines or specifies an "Equal" condition, then a comparison of an observed runtime reference data with the same values would return a "True" result and no security action would be taken. Various other examples are possible.

The node 410 may also or alternatively include a next node address 518. The next node address 518 may indicate the next node that the application 200 is expected or allowed to proceed to. In some systems where the node 410 corresponds to a checkpoint at a branch of the application 200, the next node address 518 may be or include a plurality of next node addresses 518. If the next node address 518 does not match a received or detected next node address value of the program, a checkpoint error may be detected and/or a security action may be performed, as discussed later. The next node address 518 may alternatively indicate or represent a next node address value that may be detected or received from or through the program. The next node address 518 may be calculated, expected, or determined from internal calculations. Other variations are possible.

The checkpoint module 310 may compare information in the state table 312 with information or data in one or more counters, such as the program counter 318 and/or the time counter 320. The program counter 318 may monitor, track, and store information and data about actions, instructions, and routines of an application 200. The program counter 318 may, for example, monitor some or all instructions performed by the application 200 and may store a list of the performed routines and/or an order of routines performed by the application 200. Additionally or alternatively, the program counter 318 may monitor and store some or all memory pointer addresses and memory pointer values of the application 200 at various nodes or points, such as at each checkpoint. In some systems, the program counter 318 may be a stack pointer. The program counter 318 may be, or may be stored in, state machine hardware 316. Alternatively, the program counter 318 may be or may be stored in software, firmware, or various combinations of software, firmware, and hardware.

The time counter 320 may measure an amount of time or a duration. The time counter 320 may be initiated or started when a first action or instruction is provided by the application 200, or before, at, or after one or more routines, nodes, or checkpoints of the application 200. The time counter 320 may run or track the time continuously until the time counter 320 is stopped or deactivated. The time counter 320 may count or track a time or duration of a routine in an application 200, a time or duration between one or more nodes 410, 412, 414, and 416 of an application 200, and/or a time or duration of a portion or entire application 200. The time counter 320 may, for example, be an electronic or processor clock, a counter or incrementing device, logic, software, state machine hardware 116 or other hardware, firmware, or a combination of software, hardware, and firmware. The time counter 320 may be operated manually or by one or more components such as the checkpoint module 310.

To provide security using one or more or all of the measured discussed above, the checkpoint module 310 may utilize actual or observed application information gathered, tracked, and/or stored in the program counter 318 and the time counter 320 in conjunction with the authorized values stored in the state table 312 to perform various verification procedures or functions at checkpoints of the application 200. For example, the checkpoint module 310 may, at one or more checkpoints, verify an order of routines performed by the application 200. To verify the order, the checkpoint module 310 may access an authorized order of routines or application path using checkpoint logical conditions 512 stored in a state table 312, and may compare the authorized order of routines or application path with an actual order of routines or application path tracked and stored in a program counter 318. Where the actual order of routines or application path tracked in the program counter 318 matches at least one of the authorized order of routines or application path in the checkpoint logical condition 512, the application 200 may proceed and continue to operate as normal and without interruptions. Alternatively, where the actual order of routines or application path tracked in the program counter 318 does not match the authorized order of routines or application path, the checkpoint module 310 may detect a checkpoint error and may initiate or perform one or more security actions, as discussed later. The verification of an application path may provide increased security and protection for the application, and may prevent thieves 150 and hacker 155 who may otherwise try to manipulate an application 200 to arrive at a checkpoint without performing previous, necessary routines such as log-in or authorization routines.

The checkpoint module 310 may also or alternatively, at one or more checkpoints, verify a timing or duration of a routine of the application 200. To verify the duration of the routine, the checkpoint module 310 may access an authorized timing or duration of the routine from timestamp information 510 stored in a state table 312, and may compare the authorized timing or duration with an actual tracked time of the routine measured by the time counter 320. Where the tracked time of a routine measured by the time counter 320 is within one or more of the time intervals identified by the timestamp information 510 in the state table 312, the application 200 may proceed and continue to operate as normal and without interruptions. Alternatively, where the tracked time of a routine measured by the time counter 320 is not within one or more of the time intervals identified by the timestamp information 510 in the state table 312, the checkpoint module 310 may detect a checkpoint error and may initiate or perform one or more security actions, as discussed later. Verification of a duration of a routine or action of an application 200 may protect not only electronic attacks on a software or code of an application 200, but also may prevent a thief 150 from modifying a speed or clock of a processor running an application 200, such as through or with laser, light, temperature, or voltage attacks.

The checkpoint module 310 may also or alternatively verify one or more values observed at a checkpoint. For example, the checkpoint module 310 may, at one or more checkpoints, access an authorized memory address 514 of a checkpoint memory pointer stored in the state table 312, and may compare the authorized memory address 514 with an actual memory address of a pointer observed at the checkpoint and stored in the program counter 318. Where the actual memory address of the pointer matches the authorized memory address 514 in the state table 312, the application 200 may proceed and continue to operate as normal and without interruptions. Alternatively, where the actual memory address of the pointer observed at the checkpoint and stored in the program counter 318 does not match the authorized memory address 514 in the state table 312, the checkpoint module 310 may detect a checkpoint error and may initiate or perform one or more security actions.

As another example of verifying values, the checkpoint module 310 may access and compare a control check value 516 of a pointer stored in the state table 312 with an actual pointer value of a pointer observed at the checkpoint. Where the actual pointer value of the pointer observed matches the authorized control check value 516 in the state table 312, the application 200 may proceed and continue to operate as normal and without interruptions. Alternatively, where the actual pointer value of the pointer stored in the program counter 318 does not match the authorized control check value 516 in the state table 312, the checkpoint module 310 may detect a checkpoint error and may initiate or perform one or more security actions, as discussed below. The checkpoint logical condition 512 may provide various logical comparison operations, such as, for example, OR, AND, XOR, or NOT functions or arithmetic operations, for or between a control check value 516 and runtime reference data or other values obtained by a memory address of an observed memory pointer, such as a memory address that equals the memory address 514. Other examples are possible.

The verification of both a pointer address and the value content of the pointer by the checkpoint module 310 may provide increased security and protection for the application. Thieves 150 and hacker 155 who may try to modify a pointer at a checkpoint, or may try to monitor a value of the pointer at a checkpoint, may be foiled or detected by the checkpoint module 310 through one or both of these value verification procedures.

In addition or alternatively to monitoring and verifying an operation of an application 200 in a device 300, the checkpoint module 310 may monitor and verify the operation of the application 200 at branch points. Branch points may be points in an application 200 where more than one subsequent routine may be authorized to be performed, such as at checkpoints 215, 230, and 240. As an example, at the end of routine 225, the application 200 may arrive at the branch point checkpoint 230, from which the application may either proceed with routine 235 or routine 255.

Figure 6:
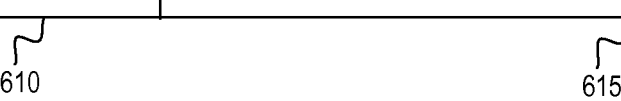
FIG. 6 is an exemplary block diagram of a branch table.

In verifying an operation of the application 200 at a branch point, the checkpoint module 310 may access a next node address 518 of the node 410 at the checkpoint. Prior to allowing the application 200 to move past the checkpoint and proceed, the checkpoint module 310 may verify the branch logic of the application 200. The checkpoint module 310 may first perform a comparison or arithmetic algorithm or function using the next node address 518 and one or more stored values. The arithmetic algorithm or comparison may return or result in a branch value.

Where the algorithm or comparison yields a branch value of 0 or indicates that the next node address 518 corresponds or matches the stored value, the next node address 518 may be designated or determined to be verified. The checkpoint software 310 or the application 200 may then compare the next node address 518 to the branch table 314. An example of a branch table 314 is shown in FIG. 6. The branch table 314 may include a node address column 610 and an instruction column 615. The next node address 518 may be located in the node address column 610 of the branch table 314, and the instruction in the instruction column 615 corresponding to the next node address 518 may be performed by the application 200.

Where the algorithm or comparison yields a non-zero branch value or indicates that the next node address 518 does not correspond or match the stored value, the checkpoint module 310 may recognize that the application 200 or device 300 may have been infiltrated or attacked. In some of these situations, the checkpoint module 310 may institute or initiate a security action, such as an alarm or a full hardware reset.

As an example, an application may reach or come to node 230. At node 230, one or more stored values may be subtracted from one or more next node addresses 518 of the node 230. Where the subtraction of the one or more stored values from the one of the next node addresses 518 yields an expected result, the next node address 518 that yielded the expected result may be verified, and may be compared to a branch table 314. The next node address 518 may be found on the branch table 314, and the instruction corresponding to the next node address 518 may indicate that the method proceed to either node 260 or node 240. Various other examples are possible.

The calculation of a branch value using two values in verifying a next node address 518 may provide benefits to an application 200. A thief 150 or hacker 155 may not be able to monitor and successfully alter one value of an application 200, such as a result of an "if" then "else" instruction. Rather, altering one value, such as the next node address 518, will result in an invalid and unauthorized branch value, which will result in a security action instruction. In this way, the application 200 may be further protected from one or more hackers 155 who wish to alter one instruction in the application 200.

The checkpoint module 310 may perform one or more of these or other verification actions or functions each time a checkpoint of the application 200 is reached. At some checkpoints, all of these verification actions may be performed. At other checkpoints some or no verification actions may be performed. Other variations are possible.

Where a checkpoint error is determined by the checkpoint module 310 through any one or more verification actions, the checkpoint module 310 may initiate or perform a number of different security actions. For example, the checkpoint module 310 may trigger, send, or display an alarm or report to a user 105 of the device 300 or to a remote server or processor. The alarm may indicate a type of error detected, a threat level, the type of checkpoint error detected, further security actions taken, and various other information. The checkpoint module 310 may additionally or alternatively shut down or protect one or more resources of a device 300 from being accessed by the application 200. The checkpoint module 310 may, for example, institute or initiated a full hardware or software reset. The checkpoint module 310 may terminate an application 200. The checkpoint module 310 may redirect an application to one or more alternative routines or instructions. In some systems, the checkpoint module 310 may note that a potential security breach has occurred, and may tighten or narrow one or more future time intervals stored as timestamp information for pending or upcoming nodes. The security action initiated or performed by the checkpoint module 310 may or may not depend on the type or checkpoint error, deficiency, inconsistency or intrusion detected or identified by the checkpoint module 310. Various other security actions may be performed.

Figure 7:
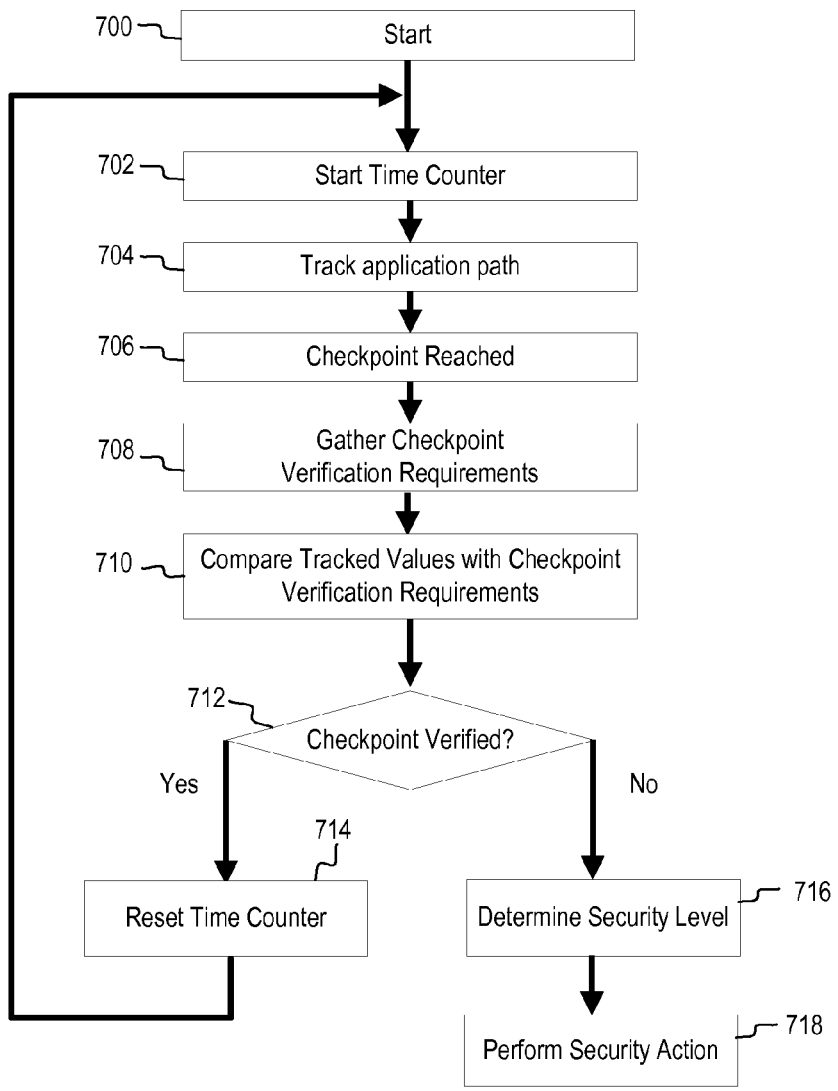
FIG. 7 is an exemplary flowchart of a method of using a system for verifying an operation of a device.

FIG. 7 illustrates an exemplary method of using the verification system of the device 300 to protect and verify an operation of an application 200. The method may begin at block 700. Block 700 may correspond to a start or initiation of monitoring of an application 200 by the checkpoint module 310. In some systems, the checkpoint module 310 may begin monitoring the application 200 when the application 200 is initialized or started. In other systems, the checkpoint module 310 may be manually initialized at various points, or may be started and used to monitor an application 200 after the application 200 has begun running. Other variations are possible.

At block 702, the time counter 320 may be started or otherwise initiated. The starting or initiation of the time counter 320 may correspond to beginning of the application 200. In subsequent cycles or other variations of the method, the starting or initiation of the time counter 320 may correspond to a checkpoint or performance of an instruction of an application. The time counter 320 may be started or initiated, for example, by an instruction or command from the checkpoint module 310. In another example, the time counter 320 may be initialized automatically upon detection of a checkpoint or when an instruction or routine is performed by the application. In other examples, the time counter 320 may be initialized manually or in various other ways.

At block 704, an application path may be tracked. The application path may be, for example, a list or order of actions, instructions or routines received, transmitted, or performed by the application 200. The application path may be monitored and tracked by the program counter 318. The application path may also or alternatively be monitored and tracked by the checkpoint module 310. In some systems, the checkpoint module 310 may monitor the application path by or using information or data gathered or stored in the program counter 318. The application path may be monitored and updated continuously, periodically, at various time intervals, or when certain actions or instructions are performed by, or sent to or from, the application 200.

At block 706, a checkpoint may be reached. The checkpoint may relate, for example, to one or more decision points or branch points 215, 230, 240, and 260 of the application 200, an intermediate point 270 of a routine 265 of the application 200, or an endpoint 275 of the application 200. The checkpoints may be automatically or manually determined or identified.

At block 708, checkpoint verification requirements may be gathered or accessed by the checkpoint module 310. Checkpoint verification requirements may be or include information stored in the state table 312, such as timestamp information 510, checkpoint logical conditions 512, memory addresses 514, control check values 516, and next node addresses 518. Other variations are possible.

At block 710, the tracked values, such as the duration of the routine tracked by the time counter 320 and the application path tracked by the program counter 318, may be compared to the gathered checkpoint verification requirements. For example, the checkpoint module 310 may access an authorized order of routines using checkpoint logical conditions 512 stored in a state table 312, and may compare the authorized order of routines with an actual order of routines tracked and stored in a program counter 318. As another example, the checkpoint module 310 may access an authorized timing or duration of the routine from timestamp information 510 stored in a state table 312, and may compare the authorized timing or duration with an actual tracked time of the routine measured by the time counter 320. Additionally or alternatively, the checkpoint module 310 may access an authorized memory address 514 of a checkpoint memory pointer stored in the state table 312, and may compare the authorized memory address 514 with an actual memory address of a pointer observed at the checkpoint and stored in the program counter 318. As another example, the checkpoint module 310 may access and compare a control check value 516 of a pointer stored in the state table 312 with an actual pointer value of a pointer observed at the checkpoint. These verification actions may be performed in any order. At some checkpoints, only some of these verification actions may be performed, while at other checkpoints, these verification actions and/or other verification actions may be performed.

At block 712, a determination may be made as to whether the checkpoint is verified or not. Where the checkpoint module 310 does not detect any checkpoint errors during any of the verification actions, the checkpoint may be verified, and the method may proceed to block 714. At block 714, the time counter 320 may be reset, and the method may return to block 702 where the time counter 320 is restarted. In this way, the time counter 320 may begin tracking a time or duration between the checkpoint reached in block 706 and the next checkpoint to be reached. The application 200 may proceed and continue to operate in a normal and unhindered manner. Other variations or actions are possible.

Where the checkpoint module 310 detects any checkpoint error in any of the verification actions, the checkpoint may not be verified, and the method may proceed to block 716. In block 716, a security level may be determined. For example, a checkpoint error of a first type may be considered a security threat at a first security level, while a checkpoint error of a second type may be considered a security threat at a second security level. The security level may depend on the type or frequency of checkpoint errors. Various security levels may be determined. In some methods, block 716 may be eliminated, such as where only one security level exists and/or only one security action may be performed.

At block 718, a security action is performed, such as any of the security actions discussed above. The performed security action may correspond to the determined security level. For example, where the checkpoint error is of a first type, a message may be sent to a user indicating that the device 300 may be compromised. Where the checkpoint error is of a second type, the application 200 may be terminated and the device 300 may be locked. Other variations are possible.

The method of FIG. 7 may be repeated for each routine in an application 200 until the application 200 reaches an end or termination point, until a checkpoint is not verified, or until a security alarm is performed. The method of FIG. 7 may protect an application 200 and a device 300 by detecting physical and digital or electronic attacks of various types on an application 200, and taking security actions when such attacks are detected.

Applications may be run by one or more devices 110, 115, 120, and 125 and may be used to communicate between devices over the network 140. The network 140 may include wide area networks ("WAN"), such as the Internet, local area networks ("LAN"), campus area networks, metropolitan area networks, wireless networks, wired networks, a direct connection such as through a Universal Serial Bus ("USB") port, or any other networks that may allow for data communication. The network 140 may be regarded as a public or private network connection and may include, for example, a virtual private network or an encryption or other security mechanism employed over the public Internet, or the like.

A memory 306 that may be used with a device 300 may be a main memory, a static memory, or a dynamic memory. The memory 306 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. Where the memory 306 includes a computer-readable medium, the computer-readable medium may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

In one embodiment, the memory 306 includes a cache or random access memory for the processor 304. In alternative embodiments, the memory 306 is separate from the processor 304, such as a cache memory of a processor, the system memory, or other memory. The memory 306 may be an external storage device or database for storing data. Examples include a hard drive, CD, DVD, memory card, memory stick, floppy disc, universal serial bus ("USB") memory device, or any other device operative to store data.

The methods, devices, and logic described above may be implemented in many different ways in many different combinations of hardware, software, and firmware, or various combinations of hardware, software, and firmware. For example, all or parts of the system may include circuitry in a controller, a microprocessor, or an ASIC, or may be implemented with discrete logic or components, or a combination of other types of analog or digital circuitry, combined on a single integrated circuit or distributed among multiple integrated circuits. All or part of the logic 308 may be implemented as instructions for execution by a processor 304, controller, or other processing device and may be stored in a tangible or non-transitory machine-readable or computer-readable medium as described. Thus, a product, such as a computer program product, may include a storage medium and computer readable instructions stored on the medium, which when executed in an endpoint, computer system, or other device, cause the device to perform operations according to any of the description above. The logic 308 may include an operating system, application program, firmware, or other logic. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library ("DLL")). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for monitoring an application, comprising:
a state table including a plurality of state table nodes corresponding to checkpoints of an application, the state table nodes including an authorized time interval and an authorized application path;
circuitry configured to track an operation time between successive checkpoints of the application;
circuitry configured to track and store an operation path for the application;
circuitry configured to detect an error in an operation of the application at a checkpoint, the detection comprising:
identification of a checkpoint state table node corresponding to the checkpoint, comparison of the authorized time interval for the checkpoint state table node and the operation time tracked, and comparison of the authorized application path for the checkpoint state table node and the operation path tracked;
identification of a branch value corresponding to a next node address and comparison of the authorized application path for the next node address; and
comparison of an authorized pointer value and an observed pointer value; and
circuitry configured to perform a security operation in response to the error in the operation, the error detected by at least one of the tracked operation time not being within the authorized time interval, the tracked operation path not matching the authorized application path, the next node address not being in the authorized application path, or the authorized pointer value does not match the observed pointer value, wherein the security operation performed is selected according to a security level of the detected error.

2. The system of claim 1, wherein the checkpoint occurs before processing confidential information.

3. The system of claim 1, wherein circuitry is configured to perform an intended instruction when the tracked operation time is within the authorized time interval and the tracked operation path matches the authorized application path.

4. The system of claim 3, further comprising a branch table including a plurality of entries having branch values and corresponding instructions, and circuitry is configured to select an entry in the branch table as the branch value corresponding to the next node address, and interpret the corresponding instruction of the selected entry as the intended instruction.

5. The system of claim 1, wherein circuitry is configured to trigger a reset of the time tracked at the checkpoint.

6. A method of monitoring an application on a device, comprising:
   initiating a time counter when a routine of the application begins, the time counter configured to track a duration of the routine between successive checkpoints of the application;
   tracking and storing an application path of the routine, the application path associated with an order of instructions performed by the application;
   comparing, at a checkpoint of the application, the tracked duration of the routine and an authorized time interval for the routine accessed from a checkpoint state table node corresponding to the checkpoint, wherein the authorized time interval is associated in a state table with the checkpoint state table node;
   comparing, at the checkpoint, the tracked application path of the routine and an authorized application path associated in a state table with the checkpoint state table node;
   identifying a pointer value at the checkpoint and comparing the identified pointer value to an authorized pointer value associated in a state table with the checkpoint state table node;
   identifying a branch value corresponding to a next node address at the checkpoint and comparing the next node address with the authorized application path; and
   performing a security action in response to detection of a checkpoint error, wherein the checkpoint error occurs when at least one of the tracked duration of the routine is not within the authorized time interval, the tracked application path of the routine does not match the authorized application path, the pointer value does not match the authorized pointer value, or the next node address is not found in the authorized application path, wherein the security action is selected based on a frequency of checkpoint errors detected.

7. The method of claim 6, wherein the security action performed when the tracked duration of the routine is not within the authorized time interval is different than the security action performed when the tracked application path of the routine does not match the authorized application path.

8. The method of claim 6, wherein the comparison of the next node address with the stored value comprises subtracting the stored value from the next node address.

9. The method of 6, further comprising:
   identifying the branch value from an entry in a branch table associated with the next node address in response to the comparison being an expected result; and
   performing an instruction corresponding to the identified entry.

10. The method of claim 6, further comprising resetting the time counter at the checkpoint.

11. The method of claim 6, wherein a user of the device is not notified when the security action is performed.

12. A non-transitory computer readable storage medium comprising computer executable instructions, the computer readable storage medium comprising:
   instructions to identify a checkpoint state table node corresponding to a checkpoint of an application, the checkpoint state table node included in a state table, the state table including a plurality of checkpoint state table nodes corresponding to checkpoints of the application, the checkpoint state table nodes including an authorized operation time and an authorized application path;
   instructions to track an operation time between said checkpoint and a previous checkpoint;
   instructions to determine validity of the operation time based on comparison with the authorized operation time of the checkpoint state table node;
   instructions to identify a type of error in response to the operation time being outside the authorized operation time;
   instructions to record an application path to said checkpoint, the application path associated with an order of instructions performed by the application;
   instructions to determine validity of the application path based on comparison with the authorized application path of the checkpoint state table node;
   instructions to identify the type of error in response to the application path being different from the authorized application path;
   instructions to identify, at the checkpoint, a branch value corresponding to a next node address that is an address of a next instruction of the application;
   instructions to determine validity of the next node address by comparison with a next node address from the authorized application path;
   instructions to identify the type of error in response to the next node address being absent from the authorized application path;
   instructions to determine an intended address at the checkpoint;
   instructions to determine validity of the intended address by comparison of the intended address with an authorized pointer value stored in the checkpoint state table node;
   instructions to identify the type of error in response to the intended address being invalid for being different from the authorized pointer value; and
   performing a security action based on the type of error identified, wherein the security action is selected based on a frequency of errors detected.

13. The non-transitory computer readable storage medium method of claim 12, wherein the comparison of the intended address comprises calculation of a difference between the intended address and the authorized pointer value.

14. The non-transitory computer readable storage medium of claim 13, wherein the intended address is determined valid when the comparison value is zero, and wherein the intended address is determined not valid when the comparison value is not zero.

15. The non-transitory computer readable storage medium of claim 12, wherein the security action includes a hardware reset.

16. The non-transitory computer readable storage medium of claim 12, further comprising instructions to perform a function associated with the intended address when the intended address is determined valid.

17. The non-transitory computer readable storage medium of claim 12, wherein the intended address is identified before the application processes confidential information.

18. The non-transitory computer readable storage medium of claim 12, wherein the comparison of the intended address comprises instructions to calculate a difference between contents of the intended address and the authorized pointer value.

19. The non-transitory computer readable storage medium of claim 18, wherein the contents of the intended address is a result of a calculation.

* * * * *

UNITED STATES PATENT AND TRADEMARK OFFICE
CERTIFICATE OF CORRECTION

PATENT NO. : 9,027,124 B2  
APPLICATION NO. : 13/470697  
DATED : May 5, 2015  
INVENTOR(S) : Jacob Mendel and Alexander Potievsky Page 1 of 1

It is certified that error appears in the above-identified patent and that said Letters Patent is hereby corrected as shown below:

In the Claims

In Column 14, at line 50, delete the word "method" before the word "of".

Signed and Sealed this
Tenth Day of November, 2015

Michelle K. Lee
*Director of the United States Patent and Trademark Office*